R. MITCHELL.
Harrow.

No. 196,921. Patented Nov. 6, 1877.

Attest:
Joseph H. Hunter
A. S. Sawyer

Inventor:
Robert Mitchell

UNITED STATES PATENT OFFICE.

ROBERT MITCHELL, OF LINCOLN, NEBRASKA, ASSIGNOR OF ONE-HALF HIS RIGHT TO RICHARD W. TAYLOR.

IMPROVEMENT IN HARROWS.

Specification forming part of Letters Patent No. 196,921, dated November 6, 1877; application filed May 8, 1877.

*To all whom it may concern:*

Be it known that I, ROBERT MITCHELL, of Lincoln, in the county of Lancaster and State of Nebraska, have invented a new and useful Improvement in Sulky-Harrows, of which the following is a specification:

The object I have in view is the production of a sulky-harrow of that class wherein the harrow-frame has a vibrating movement from side to side, which will be simple in construction, efficient in operation, and will not easily get out of order; and my invention therein consists, mainly, in the peculiar manner of hanging such a harrow, and in so attaching it to the main frame that it can be drawn forward by springs without interfering with its vibrating movement.

Figure 1:
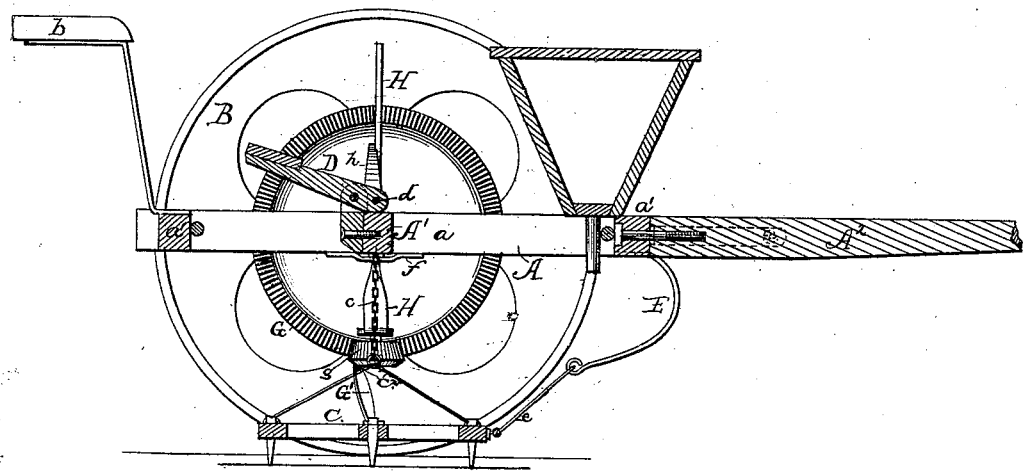
Figure 2:
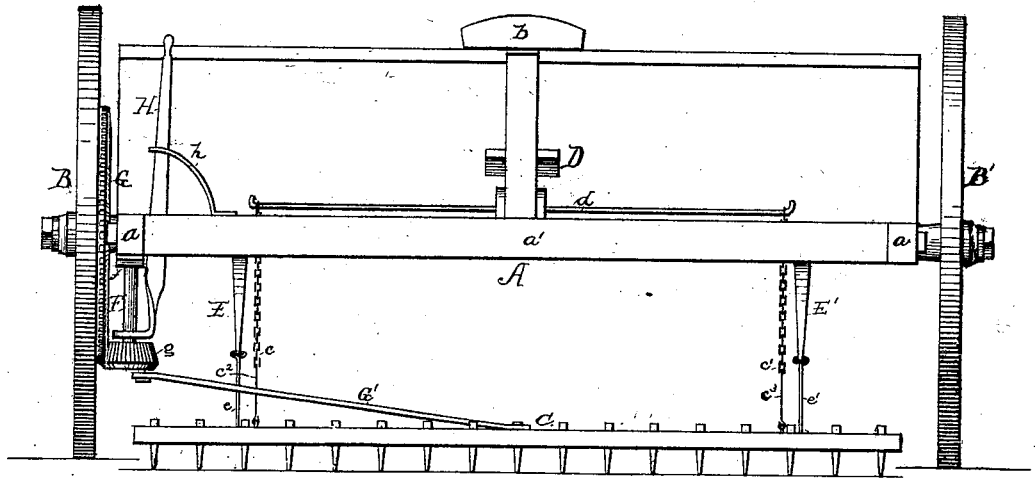

In the drawings making a part hereof, Figure 1 is a central vertical section on the line of the tongue of the machine, and Fig. 2 a rear elevation of the machine.

Like letters denote corresponding parts in each figure.

A is a rectangular frame, composed of side bars $a$ $a$ and cross-bars $a^1$ $a^1$, secured together in any suitable manner. This frame is placed with its greatest length crossing the machine, so as to give room beneath it for a long harrow. An axle-tree, $A^1$, crosses the frame A, and has mounted on its ends, outside of said frame, the wheels B B'. The driver's seat $b$ is mounted on the rear cross-bar, while the tongue $A^2$ projects forward from the center of the front cross-bar.

C is the harrow, which is quite long and narrow, and may be of the ordinary or any convenient construction. This harrow is suspended centrally from the axle-tree $A^1$ by chains $c$ $c^1$, and hangs below such axle-tree, extending nearly from one wheel to the other. The chains $c$ $c^1$ are joined to rods or chains $c^2$ $c^3$, running from the outer beams of the harrow, and meeting over the center of such harrow near each end thereof. The chains $c$ $c^1$ pass through the axle-tree, and are connected at their upper ends to a cross-bar, $d$, which is supported centrally in the end of a foot-lever, D. This lever is pivoted, in short standards on the axle-tree, directly in front of and below the driver's seat, so that such lever can be depressed by the foot of the driver.

It will be seen that by hanging the harrow in this manner it will be suspended loosely and on a horizontal plane, so that it can accommodate itself to the irregularities of the ground, independent of the rocking movement of the main frame, and the harrow, when raised from the ground, will be lifted bodily and on the same horizontal plane, and not elevated alone at one end, as heretofore.

E E' are two curved spring-arms, which are secured to the front cross-bar of the main frame, one near each end of the same. These arms are made of metal, and are curved outwardly and downwardly, and are preferably tapered, as shown, so as to form stiff springs. The lower ends of the spring-arms are loosely connected to the forward beam of the harrow by means of rods or chains $e$ $e'$. The harrow is drawn forward by these spring-arms and the connecting-chains, the said spring-arms relieving the machine from any shock when the harrow strikes an immovable obstruction, and allowing the harrow to ride over such obstruction.

By using these spring-arms the harrow and the main frame are made to last much longer than if connected rigidly.

F is a vertical shaft, which is journaled at its upper end in a rocking plate, $f$, secured to the under side of one of the side bars $a$. The lower end of this shaft is provided with a pinion, $g$, which engages with bevel-gear G on the inside of the traction-wheel B.

A pitman, G', runs from a crank-pin on the under side of the pinion $g$ to the frame of the harrow, and when the machine is moved the harrow is vibrated from side to side by means of this pitman.

For the purpose of throwing the pinion $g$ out of mesh with the gear G, I provide a lever, H, which passes down through the axle-tree, in which it is pivoted, and has a turned lower end, through which the shaft F passes. By moving the lever H, the lower end of the shaft F will be swung away from or toward the wheel, and the pinion g thrown out of or into mesh with the gear G. A spring-latch, h, holds the lever in either position.

The means employed for vibrating the harrow, it will be seen, are very simple.

My harrow may be used in connection with a seeder, I, if desired.

The advantages of my machine lie principally in its simplicity, its durability, and the ease and efficiency with which it can be operated.

Having thus fully described my machine, what I claim as new therein, and desire to secure by Letters Patent, is—

1. In a sulky-harrow, the combination, with the main frame, of the harrow-frame C, suspended loosely from its center to such main frame, and adapted to be vibrated from side to side, and springs E E', by which said harrow-frame is drawn forward, substantially as described and shown.

2. In a sulky-harrow, the harrow-frame C, adapted to be vibrated from side to side, in combination with the spring-arms E E' and connecting-rods e e', whereby the harrow-frame is drawn forward by springs without interfering with its vibrating movement, substantially as described and shown.

3. The combination, with the main frame A of a sulky-harrow, of the harrow-frame C, suspended loosely from the main frame by chains $c\ c^1$, the pitman and vertical shaft for vibrating such harrow-frame, and the spring-arms E E' and rods e e' for drawing the same forward, substantially as described.

ROBERT MITCHELL.

Witnesses:
JOSEPH HUNTER,
A. J. SAWYER.